United States Patent Office 3,302,608
Patented Feb. 7, 1967

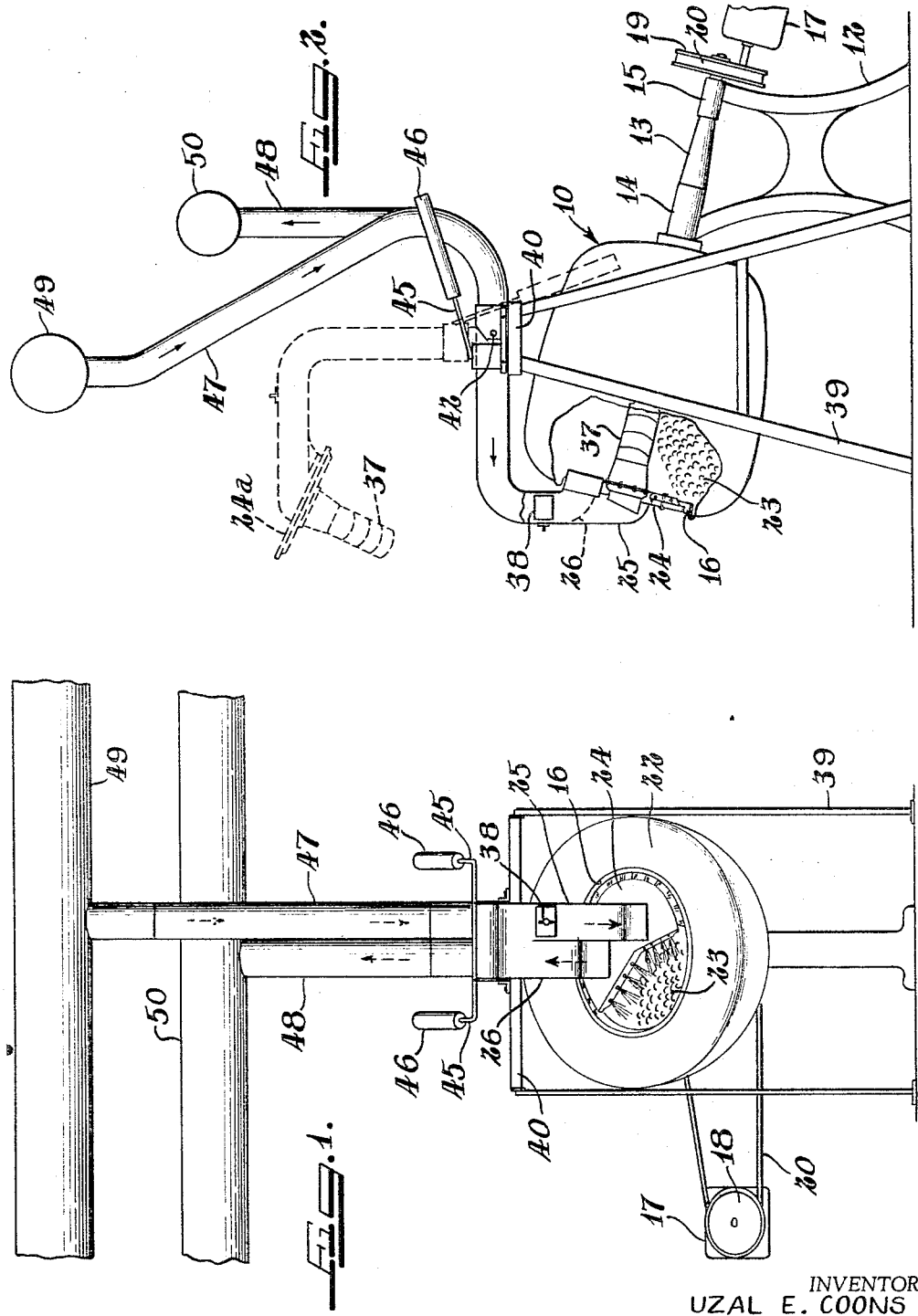

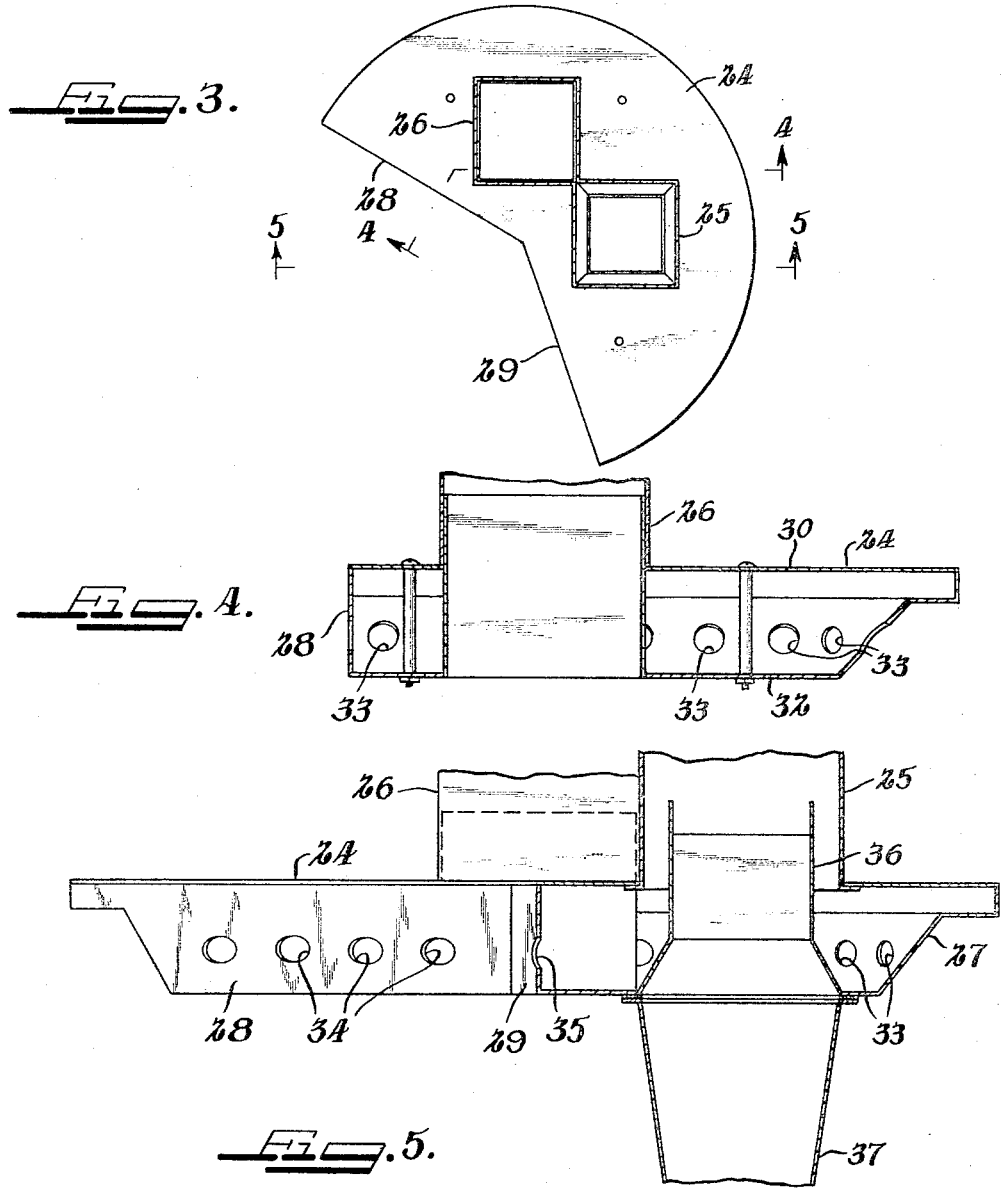

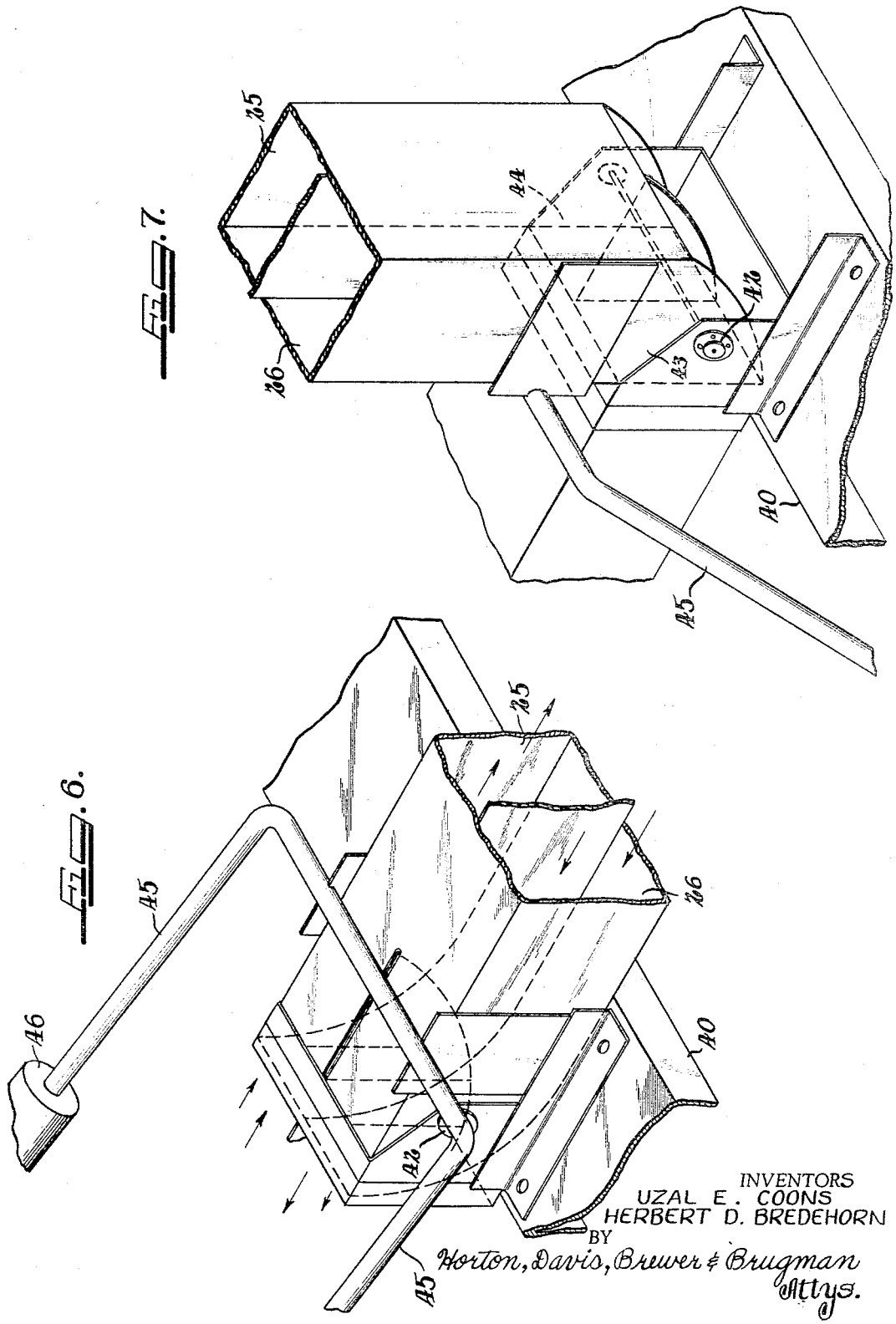

3,302,608
PELLET COATING APPARATUS AND DUST COVER SYSTEM THEREFOR
Uzal E. Coons, Oaklawn, and Herbert D. Bredehorn, Chicago, Ill., assignors to Wm. Wrigley Jr. Company, Chicago, Ill., a corporation of Delaware
Filed Sept. 17, 1963, Ser. No. 309,458
11 Claims. (Cl. 118—19)

This invention relates to pellet coating apparatus and a dust cover system therefor, and more particularly to apparatus wherein pellets, pieces or pills of a chewable or edible material are coated with an outer layer of material such as sugar and flavoring, and to a cover system which not only affords access for inspection and the addition of coating material, but also minimizes the dissemination of dust of the coating material into the room in which the apparatus is used.

While the apparatus herein disclosed is well suited to the coating of pellets of chewing gum with an outer covering of sugar and flavoring, it may readily be understood that such apparatus could well have other uses and adaptations. In the present instance, the coating material is applied in a liquid or syrup form as the pellets are tumbled in a rotating drum, and the coating material collects and is dried thereon with the aid of controlled air flow through the drum.

The erosion of coating material from the pellets in the form of dust during the tumbling and drying operations and the desirability of moving relatively large quantities of air through the drum to speed the drying and build-up of coating material has given rise to problems, including that of the dissemination of dust into the room in which the apparatus is operated. Since the drum rotates and the air ducts are relatively fixed during use, and further since it is desirable to have visibility for observation during use and access to the interior for the addition of coating material without stopping the operation of the apparatus, it is not practical or feasible to use a tightly or closely fitted cover.

It is additionally of importance that the air passing through the drum shall be directed against the tumbling pellets, so as effectively to dry the coatings and carry the moisture away in the exhaust air as rapidly as possible.

Thus, it is one of the objects of this invention to provide pellet coating apparatus wherein pellets are tumbled in a rotary drum during the coating operation and wherein the drum has associated therewith a controlled air supply and exhaust system, together with a partially open cover affording visibility for observation of the coating operation and ability to add coating material without stopping the apparatus or removing a cover, said drum, cover and air supply system being constructed and arranged to move a relatively large quantity of drying air through the drum and into contact with the tumbling pellets without disseminating a material amount of powdered coating material into the room in which the apparatus is operated.

More specifically, the invention comprehends the provision of apparatus for coating pellets or the like with an edible material applied in liquid form and dried while being tumbled, which apparatus embodies a rotary tumbling drum having a generally circular opening therein concentric with the axis of rotation of the drum, a segmental cover supported loosely relative to said opening with air nozzles in spaced relationship and directed outwardly from the periphery thereof, means for supplying air to the cover nozzles and to the interior of the drum through the cover, and means for exhausting air from the interior of the drum through the cover.

Another object of the invention is to provide a segmental cover for a pellet coating and drying drum, which cover has air inlet and exhaust passages therein, as well as peripherally disposed and spaced air nozzles and means for effecting distribution of a portion of the air in said inlet passage to the air nozzles.

As another object, this invention has within its purview the provision of apparatus and a system of the type herein referred to and wherein a cover is supported relative to a pellet coating and drying drum by air inlet and exhaust conduits embodying hinge connections by which the cover may be swung away from the drum, and said hinge connections embodying valve means by which air flow through the conduits to and from the cover is shut off when the cover is swung away from the drum.

It is another object of this invention to provide apparatus including a rotary tumbling drum having an opening therein, a cover supported relative to said opening and having air supply and exhaust passages therein with air supply and exhaust conduits connected to the exterior thereof, and a conduit mounted on the interior of the cover in communication with the air supply passage and extending into the tumbling drum for directing the flow of air supplied thereto against a lower side portion of the drum.

The invention further has within its purview the provision of a cover structure for a tumbling and drying drum which is segmental in shape to provide visibility and access to the interior of the drum, as well as hollow with air flow passages spaced around the periphery thereof, so that air under pressure supplied thereto is exhausted into the drum through the said passages.

Other objects and advantages of the invention will be apparent from the following description taken in conjunction with the accompanying drawings in which:

FIG. 1 is a front elevational view of a pellet coating apparatus and a dust cover system therefor which constitutes a preferred embodiment of our present invention;

FIG. 2 is a side elevational view of the apparatus and system shown in FIG. 1;

FIG. 3 is a top plan view of a portion of the apparatus shown in FIGS. 1 and 2;

FIGS. 4 and 5 are fragmentary sectional views taken substantially along lines 4—4 and 5—5 of FIG. 3; and FIGS. 6 and 7 are fragmentary views, drawn to an enlarged scale, of portions of the structure shown in FIGS. 1 and 2.

In the exemplary embodiment of our invention which is shown in the accompanying drawings for illustrative purposes, a tumbling drum 10 is rotatably mounted on a supporting frame 12 through a shaft 13 having an axis concentric to that of the drum and which is supported for rotation in bearings 14 and 15, which shaft is secured to one end of the drum and projects therefrom. The drum has an opening 16 at the end opposite the shaft 13, which opening is substantially concentric to the axis of the shaft. Also, the shaft and its axis slope upwardly toward the open end of the drum. The drum is driven by a prime mover 17, such as an electric motor, through means, such as pulleys 18 and 19 and a belt 20. In the disclosed structure, the drum is supported and driven for clockwise rotation when viewed from the open end, as shown in FIG. 1.

In the disclosed form, the drum is circular and is made of a metal, such as copper, closed at the shaft end and has a rim 22 at the open end which extends inwardly toward the opening 16. In use, the drum carries a quantity of pellets 23 which, in the present instance, constitute preformed pieces of chewing gum which are adapted to be coated with a layer of sugar and flavoring, as well as an outer layer of wax. The pellets ride up on the side of the drum which moves upwardly during the rotation thereof and roll downwardly into the interior of the drum.

Actually additional and larger objects, such as balls, are put with the pellets to keep them from sticking together in the tumbling process. Furthermore, as the pellets are tumbled in the drum, sugar and flavoring material in the form of syrup is added periodically to build up a coating on the surface of the pellets. Thus, access to the interior of the drum is desirable for the periodic addition of syrup, and also visibility to the tumbling pellets is desirable for visible inspection of the contents and the progress of the build up of the coating. Since the coating material is applied in a liquid form, air is required for drying the coating during the tumbling operation. This tumbling operation not only effects the provision of an even and complete coating of the pellets, but also tends to polish the pellets as they are coated. The necessity of the movement of a large quantity of air through the tumbling drum and across the tumbled pellets for drying purposes creates a problem in respect to the dissemination of dust which wears off of the surfaces of the tumbled pellets during the tumbling operation.

The desire for access to the interior of the tumbling drum for the addition of syrup, the desirability of an opening for visual inspection of the contents and the necessity of the movement of a relatively large quantity of air through the tumbling drum for effecting the drying of the pellets during coating presents a problem in respect to the effective closure of the opening of the tumbling drum, so that the dissemination of a material amount of dust from the coating material is avoided. In the disclosed structure, a cover 24 of segmental contour is provided. This cover fits loosely in the opening 16 of the drum and is supported, in the present instance, by an air inlet duct 25 and an air exhaust duct 26. These ducts extend through the cover for the passage of drying air to and from the interior of the drum.

In the disclosed structure, and as shown in detail in FIGS. 3, 4 and 5, the cover 24, in addition to being peripherally segmental in shape, is a hollow sheet metal structure having a span of approximately 270° with a segmental side wall 27 and angularly disposed side walls 28 and 29, as well as an outer wall 30 and an inner wall 32. The segmental portion of the cover spans between 180° and 270° in the opening of the drum. The segmental side wall 27 is angularly disposed with respect to the general plane of the cover to face inwardly of the tumbling drum when the cover is in position in the opening 16 of the drum, as shown in FIG. 1 and in solid lines in FIG. 2, and has openings 33 therein at peripherally spaced positions which serve as outlets or nozzles for the projection of air jets into the tumbling drum. Also, the angularly disposed surfaces 28 and 29 have openings 34 and 35 therein for the projection of air jets across the space left open by the segmental contour of the cover during operation of the unit.

While the exhaust conduit 26 passes directly through the cover 24 for the removal of air from the tumbling drum, as shown in FIGS. 3 and 4, the air inlet duct 25 embodies an air scoop 36 which divides the air passing into the tumbling drum between the hollow cover and an inner duct 37. The size of the duct 25 is proportioned with respect to the size of the air scoop 36 to divide the amounts of air which pass directly through the drum through the inner duct 37 and the openings 33, 34 and 35 of the hollow cover.

Since the pellets are carried upwardly on the side of the tumbling drum which rises in the rotation of the drum, and since it is desirable to have the air directed toward the tumbling pellets, the inner duct 37 is curved to project the main stream of air toward the tumbling pellets, as shown in FIG. 2. A damper valve 38 is provided in the air inlet duct for controlling the quantity of flow of air into the tumbling drum through the inner duct. Furthermore, the air inlet and exhaust ducts are each under controlled pressure to effect the exhaust of air at a rate greater than the input of air into the tumbling drum, whereupon there is a flow of air into the tumbling drum from the room, rather than a discharge of dusty air from the tumbling drum.

From the foregoing, it may be understood that drying air is forced into the tumbling drum and withdrawn therefrom for drying the pellets while they are being coated. While the main volume of air is directed against the pellets while they are being tumbled, air is also directed across the openings between the cover and the drum, as well as into the drum for preventing the escape of dust from the open segment of the drum opening. Thus, access is provided to the interior of the drum while it is in operation and the contents of the drum may be observed during operation.

For the support of the cover relative to the tumbling drum, we have utilized the structure of the ducts 25 and 26, which ducts are secured to the cover 24, as shown in FIGS. 3, 4 and 5. In the structure disclosed, a support frame 39 has thereon a support platform 40 from which the ducts 25 and 26 are carried. As shown in detail in FIGS. 6 and 7, as well as in the more general views of FIGS. 1 and 2, the inlet and exhaust ducts 25 and 26 of the disclosed structure are constructed of sheet metal and embody a hinge joint with the duct parts 25 and 26 swingable about an axis 42 for movements of the cover to and from its operative position at the opening of the tumbling drum; the cover being shown in its raised and out-of-the-way position in FIG. 2 in dotted lines at 24a.

As depicted in FIGS. 6 and 7, the portions 25 and 26 of the inlet and exhaust ducts rest against the support platform 40 when the cover 24 is in place with respect to the tumbling drum opening 16 and support the cover in its operative position with respect to the tumbling drum. As shown in FIG. 6, the ducts rest against the support platform 40, to carry the weight of the cover while in its operative position, and extend upwardly, as shown in FIG. 7, when in the raised position depicted in FIG. 2. When in the lowered or operative position shown in FIG. 6, the ducts are open for the flow of both inlet and exhaust air. However, when in the raised position, shown in FIG. 7, portions 43 and 44 of the duct walls act as shut-off valves to close the ducts, whereby air flow therethrough is stopped. In order to counterbalance the weight of the cover 24, lever arms 45 and counterbalance weights 46 are provided.

The ducts 25 and 26 respectively connect and are in communication with air inlet and exhaust conduits 47 and 48 respectively, which connect and communicate with conduits 49 and 50 respectively.

As exemplary values for the accomplishment of the purposes of this invention for its intended purpose, the air is supplied to the tumbling drum at the rate of approximately 300 cubic feet per minute, while the exhaust duct pressure is such that air is removed from the tumbling drum at a rate of approximately 350 cubic feet per minute. From the foregoing it may be understood that during the tumbling operation of the pellets being coated, and while a relatively large volume of air moves through the tumbling drum, there is a tendency for air to move into the tumbling drum, rather than from it. Furthermore, jets of air in controlled quantities which move across the openings between the cover and the drum are exhausted to prevent the dissemination of dust from the drum. It may further be observed that the structure herein provided, in addition to affording a practically dust-free atmosphere in the room in which it is operated, also provides an efficient and effective flow of air for the accomplishment of the desired drying action, while providing a device which gives both access to the interior for adding coating material and inspection of the operation.

Having thus described our invention, what is claimed is:

1. Pellet coating apparatus and a dust cover system therefor comprising, in combination, a rotary tumbling drum having an axis of rotation and an opening substantially concentric to said axis, means for supporting said drum for rotation about said axis, means for driving the drum, a generally planar cover of segmental shape fitting loosely in said opening in the drum in generally flush relationship to an end of the drum, means supporting said cover for swinging movements to and away from said opening in the drum, said cover being hollow and having air inlet and exhaust conduits extending therethrough and spaced peripheral air outlet openings therein, means for supplying air to the interior of the cover for discharge through said spaced peripheral air outlet openings, means for supplying air to said inlet conduit and the interior of the cover at a predetermined rate, means for exhausting air through said exhaust conduit at a rate exceeding said predetermined rate, and said air inlet and exhaust conduits comprising said means supporting the cover for swinging movements.

2. Pellet coating apparatus and a dust cover system therefor comprising, in combination, a rotary tumbling drum having an axis of rotation and an opening substantially concentric to said axis, means for supporting said drum for rotation about said axis, means for driving the drum, a generally planar cover of segmental shape fitting loosely in said opening in the drum in generally flush relationship to an end of the drum, means supporting said cover for swinging movements to and away from said opening in the drum, said cover being hollow and having air inlet and exhaust conduits extending therethrough and spaced peripheral air outlet openings therein, means for supplying air to the interior of the cover for discharge through said spaced peripheral air outlet openings, means for supplying air to said air inlet conduit and the interior of the cover at a predetermined rate, means for exhausting air through said exhaust conduit at a rate exceeding said predetermined rate, and valve means in said inlet and exhaust conduits and having actuating means operable by swinging movements of said cover for shutting off the air flow in said conduits when the cover is swung away from the drum.

3. Pellet coating apparatus and a dust cover system therefor comprising, in combination, a rotary tumbling drum having an axis of rotation and an opening substantially concentric to said axis, means for supporting said drum for rotation about said axis, means for driving the drum, a generally planar cover of segmental shape fitting loosely in said opening in the drum in generally flush relationship to an end of the drum, means supporting said cover for swinging movements to and away from said opening in the drum, said cover being hollow and having an air inlet and exhaust conduits extending therethrough and spaced peripheral air outlet openings therein, means for supplying air to the interior of the cover for discharge through said spaced peripheral air outlet openings, means for supplying air to said air inlet conduit and the interior of the cover at a predetermined rate, means for exhausting air through said exhaust conduit at a rate exceeding said predetermined rate, and said segmental cover spanning betwen 180° and 270° in the opening of the drum and having an opening therein of substantially V-shape with the vertex thereof substantially coincident with the axis of said drum.

4. Pellet coating apparatus and a dust cover system therefor comprising, in combination, a rotary tumbling drum having an axis of rotation which includes a horizontal component and an opening substantially concentric to said axis so that during rotation of the drum a side portion thereof on one side of the opening moves upwardly and the side portion thereof on the other side of the opening moves downwardly, means for supporting said drum for rotation about said axis, means for driving the drum, a generally planar cover of segmental shape fitting loosely in said opening in the drum in generally flush relationship to an end of the drum, means supporting said cover for swinging movements to and away from said opening in the drum, said cover being hollow and having air inlet and exhaust conduits extending therethrough and spaced peripheral air outlet openings therein, means for supplying air to the interior of the cover for discharge through said spaced peripheral air outlet openings, means for supplying air to said air inlet conduit and the interior of the cover at a predetermined rate, and means for exhausting air through said exhaust conduit at a rate exceeding said predetermined rate, the segmental cover extending across a major portion of the top of the opening and downwardly along a major portion the side of the drum which moves downwardly when the drum is rotated.

5. Pellet coating apparatus and a dust cover system therefor comprising, in combination, a rotary tumbling drum having an axis of rotation which includes a horizontal component and an opening substantially concentric to said axis so that during rotation of the drum a side portion thereof on one side of the opening moves upwardly and the side portion thereof on the other side of the opening moves downwardly, means for supporting said drum for rotation about said axis, means for driving the drum, a generally planar cover of segmental shape fitting loosely in said opening in the drum in generally flush relationship to an end of the drum, means supporting said cover for swinging movements to and away from said opening in the drum, said cover being hollow and having air inlet and exhaust conduits extending therethrough and spaced peripheral air outlet openings therein, means for supplying air to the interior of the cover for discharge through said spaced peripheral air outlet openings, means for supplying air to said air inlet conduit and the interior of the cover at a predetermined rate, and means for exhausting air through said exhaust conduit at a rate exceeding said predetermined rate, said segmental cover providing a normally open segmental opening along the lower portion of the side of the drum which moves upwardly when the drum rotates.

6. In pellet coating apparatus and a dust cover system therefor, the combination comprising a substantially imperforate tumbling drum having an axis of rotation and an end opening concentric with the axis of rotation, a hollow shell-type partial closure of segmental shape having spaced end walls in opposed relationship to one another and side wall portions adjoined and extending between the end walls, said side wall portions fitting loosely in said opening, means for supplying air to the interior of said drum through said closure, means for exhausting air from said drum through said closure, and additional means for projecting jets of air into said drum from the sidewall portions of said closure.

7. Pellet coating apparatus and a dust cover system therefor comprising, in combination, a rotary tumbling drum having an axis of rotation and an opening at one axial end which is substantially concentric to said axis, means supporting said drum for rotation about said axis and with the axis sloping upwardly toward the open end, means for driving the drum, a cover fitting loosely in said opening and shaped to provide a normally open space along the lower region of the side of the drum which moves upwardly during rotation of the drum, means supporting the cover for movements to and away from the opening in the drum, said cover having air inlet and exhaust conduits extending therethrough for the passage of air to and from the interior of the drum, means providing orifices for the projection of air jets in spaced relationship outwardly from the periphery of the cover, means for supplying air at a predetermined rate to said air inlet conduit and said means providing orifices for the projection of air jets, and means for exhausting air at a predetermined rate through said exhaust conduit.

8. Pellet coating apparatus and a dust cover system therefor as defined in claim 7, and wherein said air inlet conduit has a projection thereon extending into the drum and toward the side of the drum which moves upwardly during rotation of the drum.

9. Pellet coating apparatus and a dust cover system therefor as defined in claim 7, and wherein said cover is peripherally segmental with circular and angularly related side portions, and wherein said means providing orifices for the projection of air jets at the circular side portions are directed angularly into the drum and those at the angularly related side portions are directed across said open space.

10. Pellet coating apparatus and a dust cover system therefor as defined in claim 7, and wherein said cover is a hollow shell, and said means providing orifices for the projection of air jets comprise openings in the periphery of the shell.

11. Pellet coating apparatus and a dust cover system therefor as defined in claim 7, and wherein said cover is segmental and spans over half of said opening in the drum.

References Cited by the Examiner

UNITED STATES PATENTS

| | | | |
|---|---|---|---|
| 1,819,557 | 8/1931 | Hunter | 118—19 |
| 1,911,761 | 5/1933 | Loomis et al. | 117—109 X |
| 2,712,183 | 7/1955 | Jorgenson | 34—131 |
| 3,010,217 | 11/1961 | Fuhring | 34—138 |
| 3,095,326 | 6/1963 | Green et al. | 118—19 X |
| 3,141,792 | 7/1964 | Lachman et al. | 118—19 X |

CHARLES A. WILLMUTH, *Primary Examiner.*

J. P. McINTOSH, *Assistant Examiner.*